(12) United States Patent
Hartline et al.

(10) Patent No.: US 6,389,617 B1
(45) Date of Patent: May 21, 2002

(54) PORTABLE SHOWER APPARATUS

(76) Inventors: George A. Hartline; Janet M. Hartline, both of 1816 Adamsburg Rd., Fort Payne, AL (US) 35967

( * ) Notice: Subject to any disclaimer, the term of this patent is extended or adjusted under 35 U.S.C. 154(b) by 0 days.

(21) Appl. No.: 09/928,481

(22) Filed: Aug. 14, 2001

Related U.S. Application Data

(60) Provisional application No. 60/266,438, filed on Feb. 6, 2001.

(51) Int. Cl.[7] ............................................... A47K 3/32
(52) U.S. Cl. ............................................ 4/599; 4/603
(58) Field of Search .......................... 4/599, 600, 602, 4/603

(56) References Cited

U.S. PATENT DOCUMENTS

| | | | | |
|---|---|---|---|---|
| 1,636,186 A | * | 7/1927 | Hickson | 4/599 |
| 1,844,038 A | * | 2/1932 | Hooker | 4/599 |
| 2,188,213 A | * | 1/1940 | Wilson | 4/599 X |
| 2,852,784 A | * | 9/1958 | Winkler | 4/599 |
| 3,629,875 A | * | 12/1971 | Dow | 4/599 |
| 5,277,209 A | * | 1/1994 | Olson | 4/602 X |
| 5,774,908 A | * | 7/1998 | Hall | 4/602 X |
| 6,049,919 A | * | 4/2000 | Roteman | 4/602 |

* cited by examiner

*Primary Examiner*—Charles E. Phillips
(74) *Attorney, Agent, or Firm*—Rodger H. Flagg

(57) ABSTRACT

A portable shower is collapsible so that it takes up a relatively small amount of space when not in use. The portable shower has a top member, a bottom member, a shower curtain, a supply water tank, and a disposal water tank. Pumps are provided for the supply water tank and the disposal water tank, which are powered by vehicle power connected via a cigarette lighter adapter in order to heat the water and to run the pumps for the portable shower. In the collapsed condition, the top member and the bottom member of the portable shower are fitted together to enclose the supply water tank, the shower curtain, and the disposal water tank. The top member and the bottom member are releasably secured together by latches in the closed condition. In an open condition, the top member and the bottom member are pulled apart, and supported from above. Alternately, at least one support rod is placed between the bottom member and the top member, in the open position. The supply water tank is heated by the sun, or provided with water and heated using power from the vehicle via the cigarette lighter adapter. The water is pumped from the supply water tank to the top member, and used water (gray water) is collected by the bottom member. The used water is then pumped to the disposal water tank, for later disposal at a remote gray water disposal location.

20 Claims, 8 Drawing Sheets

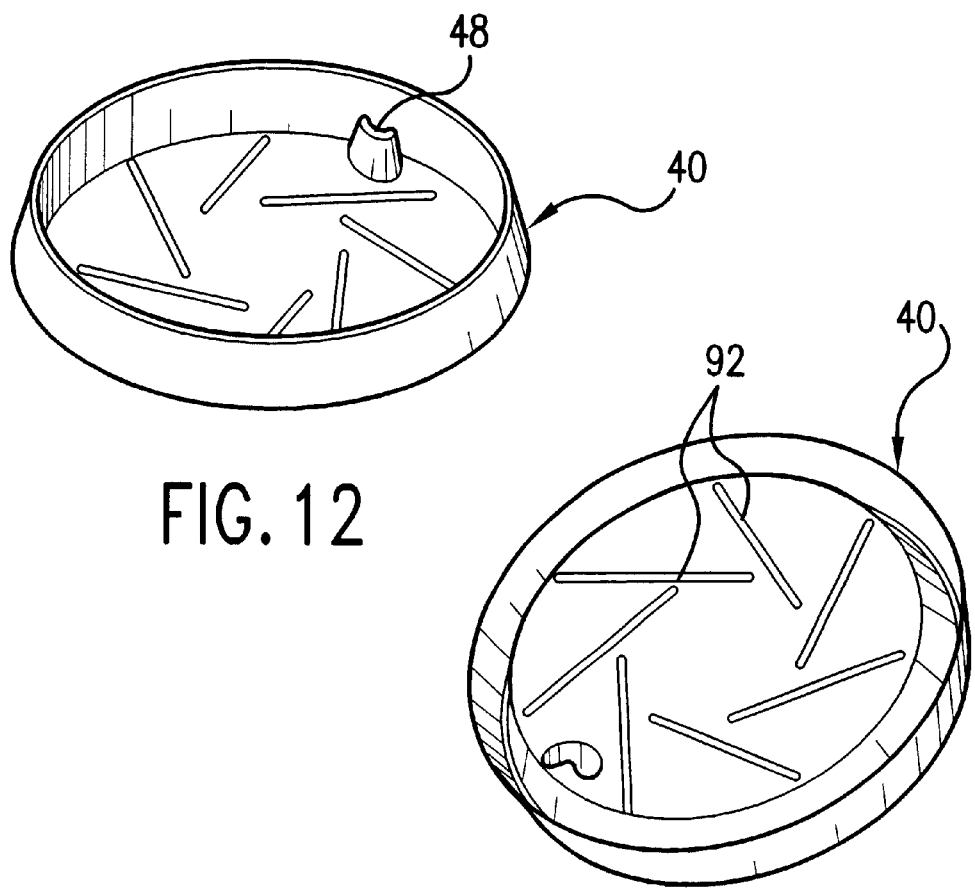
FIG. 12
FIG. 13
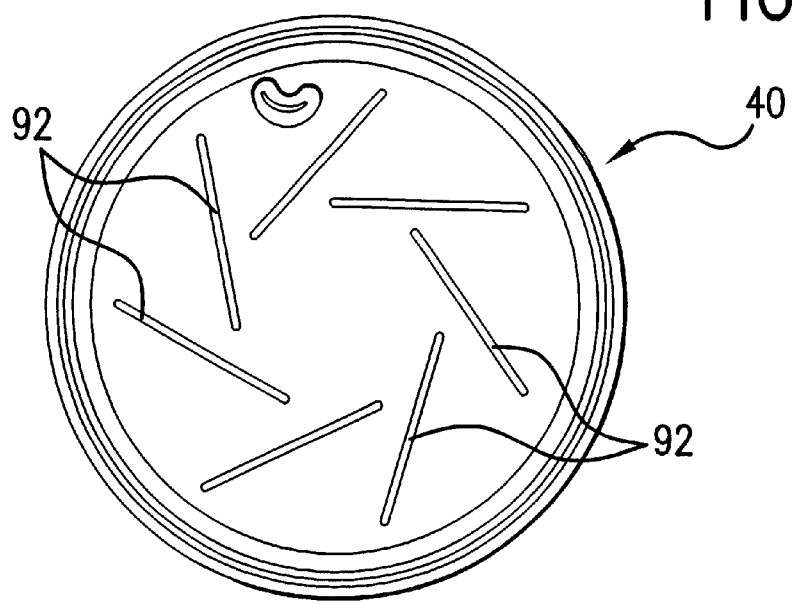
FIG. 14

PORTABLE SHOWER APPARATUS

This invention claims priority of provisional patent application Ser. No. 60/266,438 filed Feb. 6, 2001, which is incorporated by reference herein.

FIELD OF THE INVENTION

The present invention relates to portable showers. More particularly, the invention relates to a portable shower which can be carried in a cab of a truck or tractor trailer cabin, and which is collapsible so that it takes up a relatively small amount of space when not in use.

BACKGROUND OF THE INVENTION

Many types of shower devices are known. It is a problem in the art to provide a compact, collapsible shower suitable for use in a cabin of a truck or tractor trailer.

U.S. Pat. No. 5,216,763 teaches a portable shower having pumpless parts. The shower includes multiple support rings for the curtain and a pumping system to pump water in and out.

U.S. Pat. No. 5,277,209 teaches a portable shower which is collapsible. The shower has matching top and bottom reservoirs, and a way to fit them together in storage.

U.S. Pat. No. 1,147,648 teaches a portable shower with a water reservoir on the top, and a collection basin on the bottom.

U.S. Pat. No. 5,251,345 teaches a portable shower and wash which has a cigarette lighter adapter to heat the water and to run a pump for the portable shower.

SUMMARY OF THE INVENTION

From the foregoing, it is seen that it is a problem in the art to provide a device meeting the above requirements. According to the present invention, a device is provided which meets the aforementioned requirements and needs in the prior art. Specifically, the device according to the present invention provides a portable shower which can be carried in a cab of a truck or tractor trailer cabin, and which is collapsible so that it takes up a relatively small amount of space when not in use.

More particularly, the invention relates to a portable shower which is collapsible so that it takes up a relatively small amount of space when not in use, and which has a top member, a bottom member, support rods, a shower curtain, a supply water tank, and a disposal water tank. Pumps are provided for the supply water tank the disposal water tank, which are powered by vehicle power connected via a cigarette lighter adapter in order to heat the water and to run the pumps for the portable shower.

The portable shower is carried in a vehicle such as a truck cabin in a collapsed condition. In the collapsed condition, the top member and the bottom member of the portable shower are fitted together to enclose the supply water tank, the shower curtain, and the disposal water tank. The top member and the bottom member are secured together by latches in the closed condition.

In an open condition, the top member and the bottom member are pulled apart, and three support rods are placed between the bottom member and the top member, to support the top member above the bottom member. The supply water tank is provided with water and heated using power from the vehicle via the cigarette lighter adapter. The water is pumped from the supply water tank to the top member, where it passes through the shower head 48 and descends by gravity to the bottom member. The used, gray water is then pumped to the disposal water tank, for subsequent disposal, when a suitable gray water dispensing area 70, is available.

Other objects and advantages of the present invention will be more readily apparent from the following detailed description when read in conjunction with the accompanying drawings.

BRIEF DESCRIPTION OF THE DRAWINGS

FIG. 12 is a perspective view of an interior portion of a bottom member used in the portable shower assembly of FIG. 1.

FIG. 13 is a perspective view of an outer portion of the bottom member shown in FIG. 12.

FIG. 14 is a top elevational view of the outer portion of the bottom member shown in FIG. 13.

DETAILED DESCRIPTION OF THE INVENTION

Figure 1:
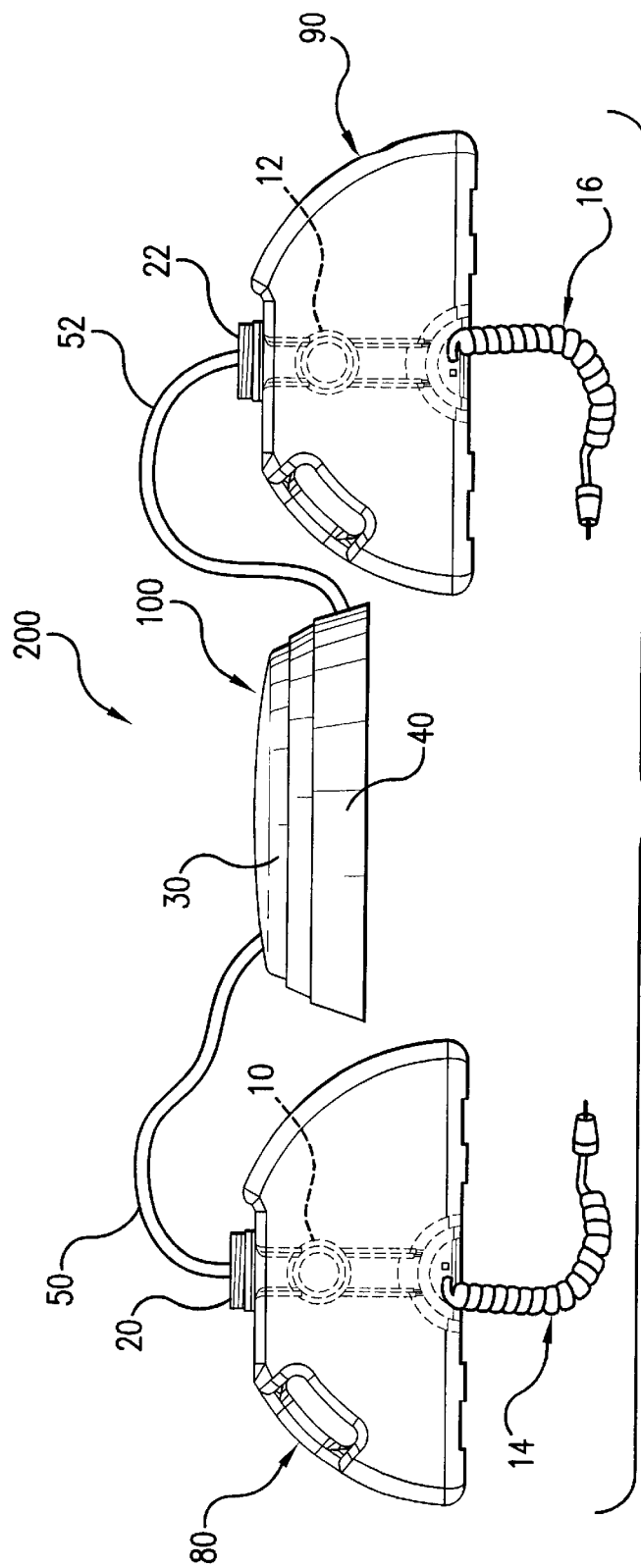
FIG. 1 is a schematic side elevational assembly view of a portable shower assembly according to the present invention.

As shown in assembly view in FIG. 1, a portable shower apparatus 200 includes a supply water tank 80, a top member 30, a bottom member 40, and a disposal water tank 90. The portable shower apparatus 200 of FIG. 1 is not shown in either its assembled condition or in its collapsed condition, but rather the connections among the functional elements thereof are shown clearly.

The supply water tank 80 has an opening 20, and contains a pump 10 (shown schematically) which can be powered from a 12 Volt D.C. power supply of a vehicle using a cigarette lighter adapter 14. The supply water tank 80 preferably is sized to hold about six gallons of water, which is sufficient for its use as a shower. The supply water tank 80 is shaped as a semicircular member, having a maximum width (diameter) of about 26 inches, and a thickness of about seven inches.

Figure 4:
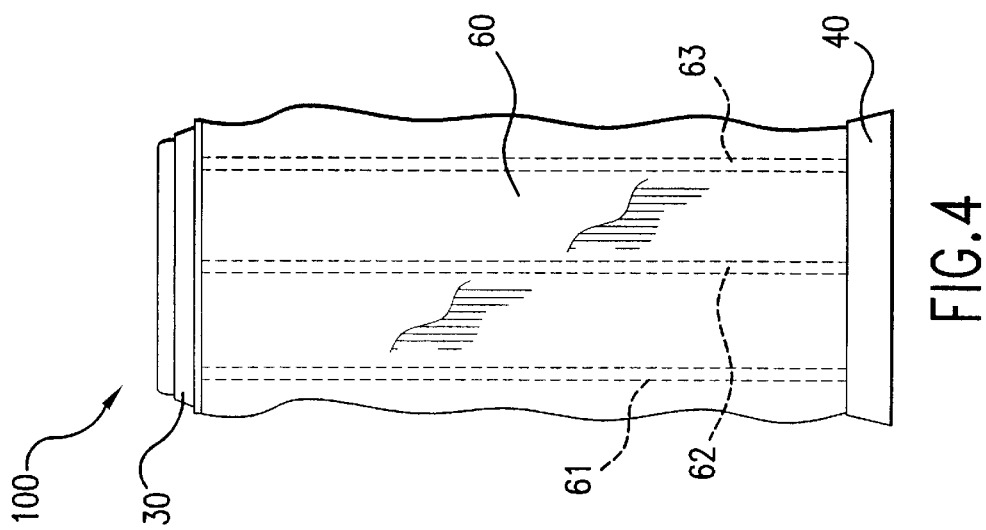
FIG. 4 is a schematic side elevational view of the portable shower assembly in an assembled condition.

The supply opening 20 of the supply water tank 80 is connected to the top member 30 by a conduit 50. The top member 30 and the bottom member 40 are shown with the top member 30 atop the bottom member 40, just prior to final assembly, and together are designated as a portable shower 100. In the assembled condition, the top member 30 would be spaced well above the bottom member 40 to form a portable shower 100 as shown in FIG. 4. The conduit 50 is preferably ⅜ inch plastic pipe.

The disposal water tank 90 has a disposal opening 22, and contains a disposal pump 12 (shown schematically) which can be powered from a 12 Volt D.C. power supply of a vehicle, using a cigarette lighter adapter 16. The disposal water tank 90 preferably is sized to hold about six gallons of water, sufficient for use to recover used water (gray water) after it has passed through the shower 100. The gray water is stored in the disposal water tank 90 until a remote gray water disposal location 70 is available. The disposal water tank 90 is shaped as a semicircular member, having a maximum width (diameter) of about 26 inches, and a thickness of about seven inches. The disposal opening 22 of the disposal water tank 90 is connected to the bottom member 40 by a disposal conduit 52.

The portable shower apparatus 200 thus provides a portable shower 100 which can be carried in a cab of a truck or tractor trailer cabin (not shown) in its collapsed condition. It is collapsible so that it takes up a relatively small amount of space when not in use. The pumps 10 and 12 are provided for the supply water tank 80 the disposal water tank 90, and are powered by vehicle power connected via the cigarette lighter adapters 14 and 16 in order to heat the water and to run the pumps 10 and 12 for the portable shower assembly 200.

In practice, the heater portion 92 (shown in FIG. 11) is sized so that it takes from about two hours to about six hours to heat the water in the supply water tank 80 to 110 degrees Fahrenheit, prior to use.

While dimensions, sizes, and capacities are provided hereinabove, the present invention is not limited thereto, and all reasonable variations therefrom are contemplated as being within the scope of the present invention.

The portable shower assembly 200 is carried in a vehicle such as a truck cabin in a collapsed condition. In the collapsed condition, the top member 30 and the bottom member 40 of the portable shower 100 are fitted together to enclose the supply water tank 80, the shower curtain 60 (shown in FIG. 4), and the disposal water tank 90. The top member 30 and the bottom member 40 are secured together by latches 41 and 42 in the closed condition (shown in FIGS. 7 and 17).

Figure 2:
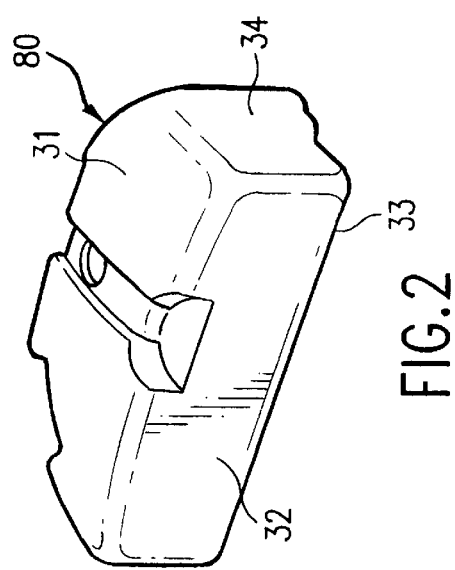
FIG. 2 is a perspective view of a supply water tank used in the assembly of FIG. 1.

FIG. 2 is a perspective view of the supply water tank 80 used in the portable shower assembly 200 of FIG. 1. The supply water tank 80 has a flat wall 32, side surfaces 31 and 33, and a curved wall 34. The disposal water tank 90 is similar in design and construction, and is therefore not separately shown.

Figure 3:
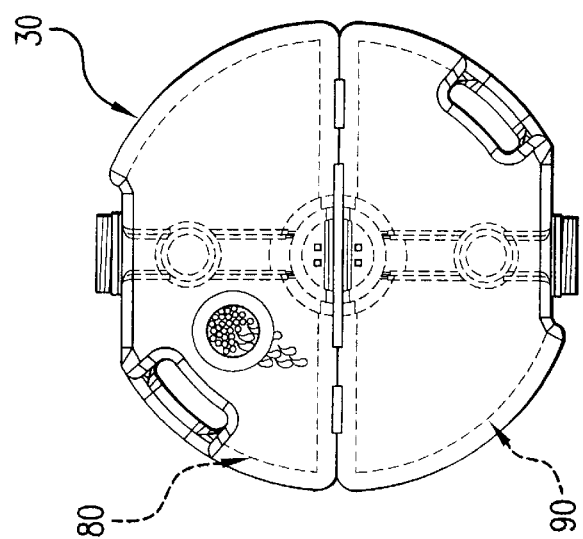
FIG. 3 is a top elevational view of the portable shower assembly in a collapsed condition.

FIG. 3 is a top elevational view of the portable shower assembly 200 in a collapsed condition. In this view, the top member 30 is seen in top elevational view, and the supply water tank 80 and the disposal water tank 90 are shown in dashed outline, stowed between and inside the assembled members 30 and 40.

FIG. 4 is a schematic side elevational view of the portable shower assembly 200 in an assembled condition. In an open (released or unsecured) condition, the top member 30 and the bottom member 40 are pulled apart, and three support rods 61, 62, and 63 are placed between the bottom member 40 and the top member 30, to support the top member 30 above the bottom member 40. The support rods 61, 62, and 63 may themselves be telescoping or collapsible, or they can be solid members which are carried alongside the portable shower 100.

The three support rods 61, 62, and 63 are preferably sufficiently strong to support the weight of the top member 30. Or, if the top member 30 is hung from above, with a suitable hook (for example), then the three support rods 61, 62, and 63 need merely be strong enough to maintain the shape of the shower curtain 60, and can therefore be flexible.

The supply water tank 80 is provided with water, and heated using power from the vehicle via the cigarette lighter adapter 14. The water is pumped from the supply water tank 80 to the top member 30. When actuated, the water in the and used water (gray water) is collected by the bottom member 40. The used water is then pumped from the disposal water tank 90 to a suitable gray water disposal location 70, when available.

Figure 5:
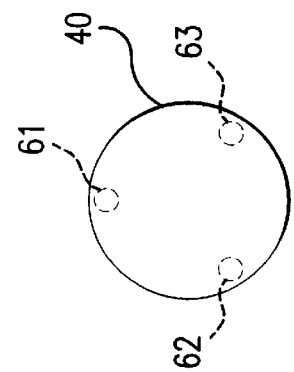
FIG. 5 is a top elevational view of the portable shower assembly in an assembled condition with support rods in place.

FIG. 5 is a top elevational view of the portable shower assembly 200 in an assembled condition with support rods 61, 62, and 63 in place above the bottom member 40.

Figure 6:
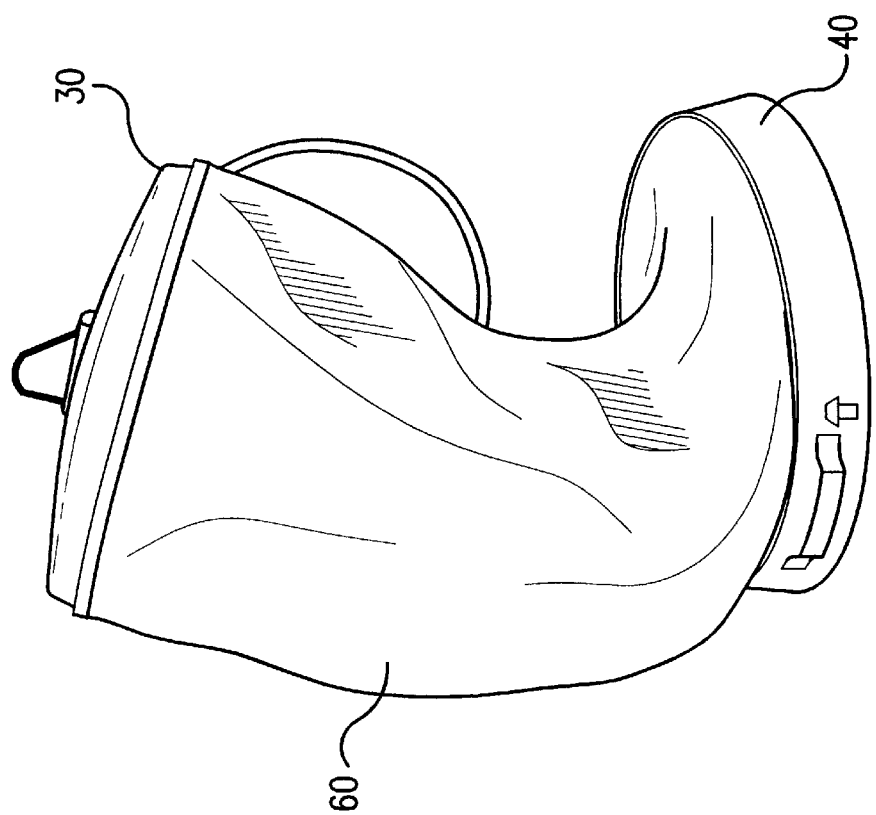
FIG. 6 is a side elevational view of the portable shower assembly being pulled apart during an assembly process.

FIG. 6 is a side elevational view of the portable shower assembly 200 being pulled apart during the assembly process. In this process, the top member 30 is grasped and pulled upwards to separate it from the bottom member 40. In the process, the shower curtain 60 is pulled along with the top member 30, into a partially extended position shown in FIG. 6.

Figure 7:
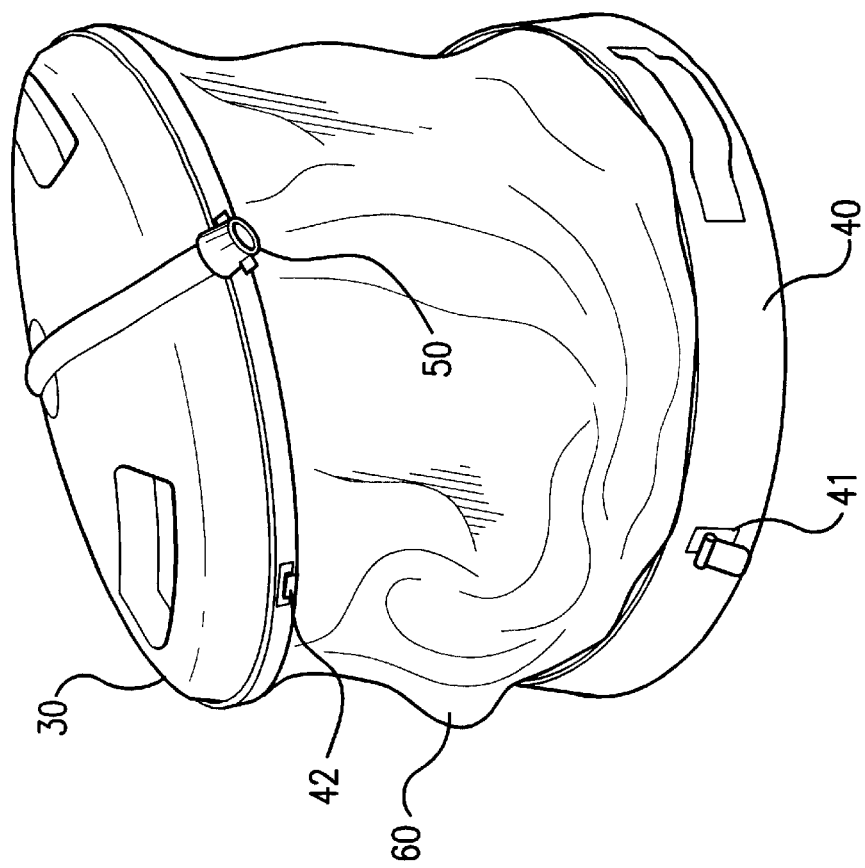
FIG. 7 is a side elevational view of the portable shower assembly being pulled apart during an assembly process, illustrating a conduit attached to a top member.

FIG. 7 is a side elevational view of the portable shower assembly 200 being pulled apart during an assembly process, illustrating a supply conduit 50 attached to the top member 30. Also, latches 41 and 42 are shown in this view. These latches 41, 42 are used to secure the top member 30 to the bottom member 40 in the collapsed condition. A plurality of latches, 41, 42 may be provided around the circumference of the top member 30 and the bottom member 40.

Figure 8:
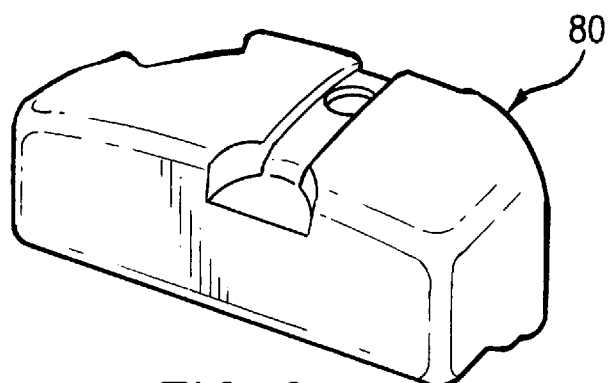
FIG. 8 is a perspective view of a supply water tank according to the invention, showing a bottom surface and side surface thereof.
Figure 9:
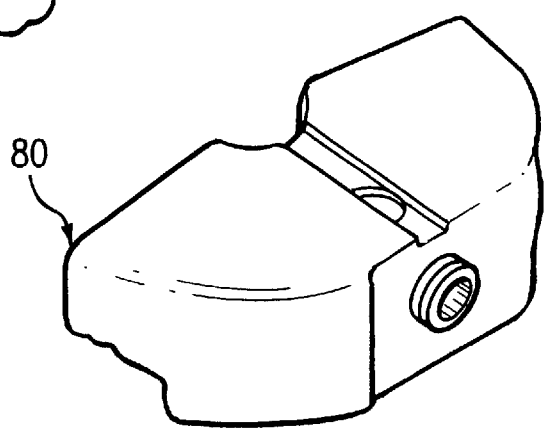
FIG. 9 is a perspective view of the supply water tank of FIG. 8, rotated clockwise ninety degrees.
Figure 10:
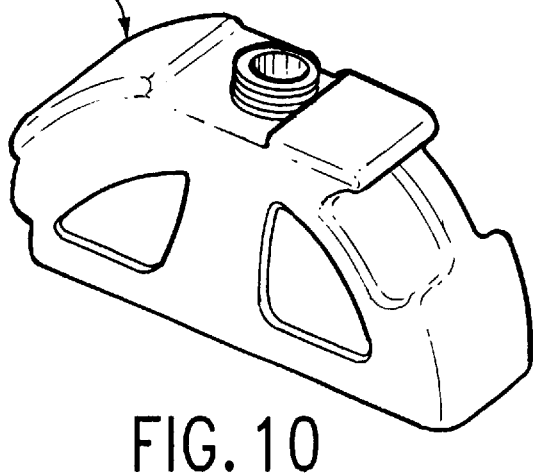
FIG. 10 is a perspective view of the supply water tank of FIG. 8, showing its top surface and water inlet.

FIG. 8 is a perspective view of a supply water tank 80, showing a bottom surface and side surface thereof. FIG. 9 is a perspective view of the supply water tank 80 of FIG. 8, rotated clockwise ninety degrees. FIG. 10 is a perspective view of the supply water tank 80 of FIG. 8, showing its top surface and water inlet. Because the disposal water tank 90 is substantially identical to the supply water tank 80, the tank shown in FIGS. 8, 9, and 10 may be considered to describe the disposal water tank 90 as well.

Figure 11:
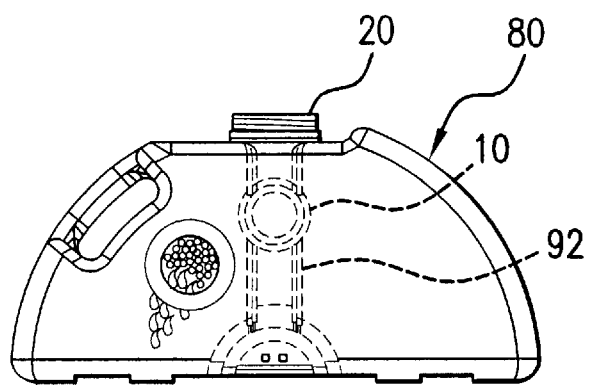
FIG. 11 is a side elevational schematic view of the supply water tank of FIG. 8.

FIG. 11 is a side elevational schematic view of the supply water tank 80 of FIG. 8. In this schematic view, the pump 10 and heater element 92 are shown, as well as the supply opening 20. The supply opening 20 may be secured or closed by a cap 24, or the cap 24 may be entirely omitted, to suit manufacturing or user preference.

FIG. 12 is a perspective view of an interior portion of the bottom member 40 used in the portable shower assembly of FIG. 1.

FIG. 13 is a perspective view of an outer portion of the bottom member 40 shown in FIG. 12.

FIG. 14 is a top elevational view of the outer portion of the bottom member 40 shown in FIG. 13.

Figure 15:
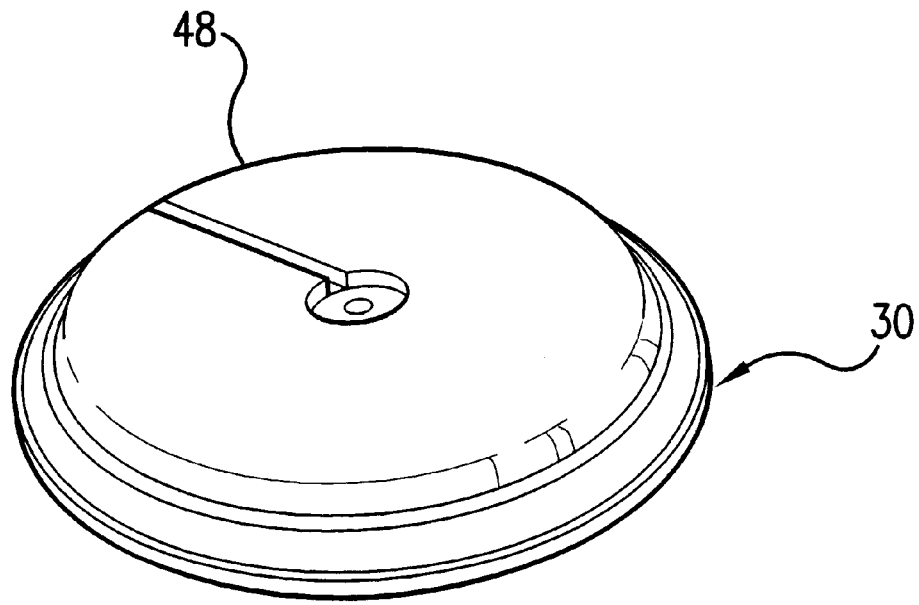
FIG. 15 is a perspective view of an interior portion of a top member used in the portable shower assembly of FIG. 1.
Figure 16:
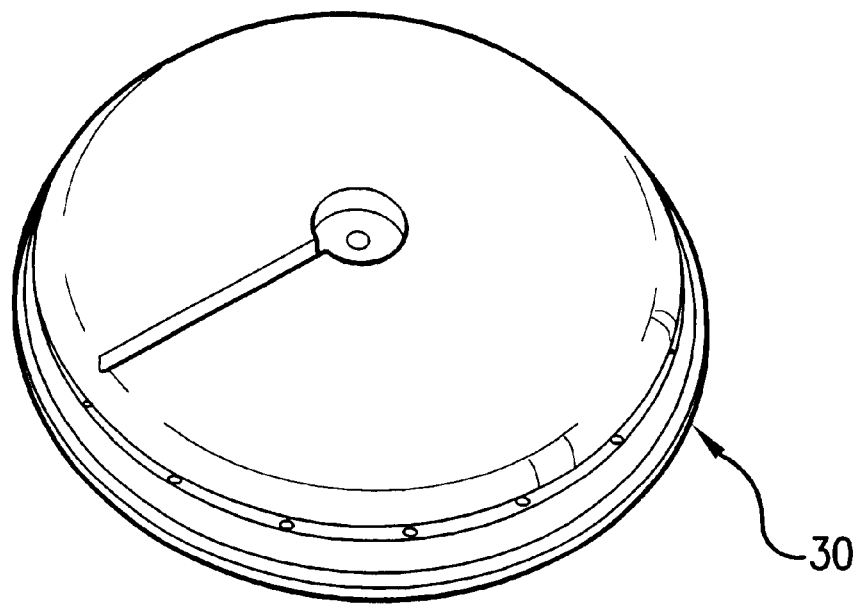
FIG. 16 is a perspective view of an outer portion of the top member shown in FIG. 15.

FIG. 15 is a perspective view of an interior portion of the top member 30 used in the portable shower assembly of FIG. 1. showing a shower head 48. FIG. 16 is a perspective view of an outer portion of the top member 30 shown in FIG. 15.

Figure 17:
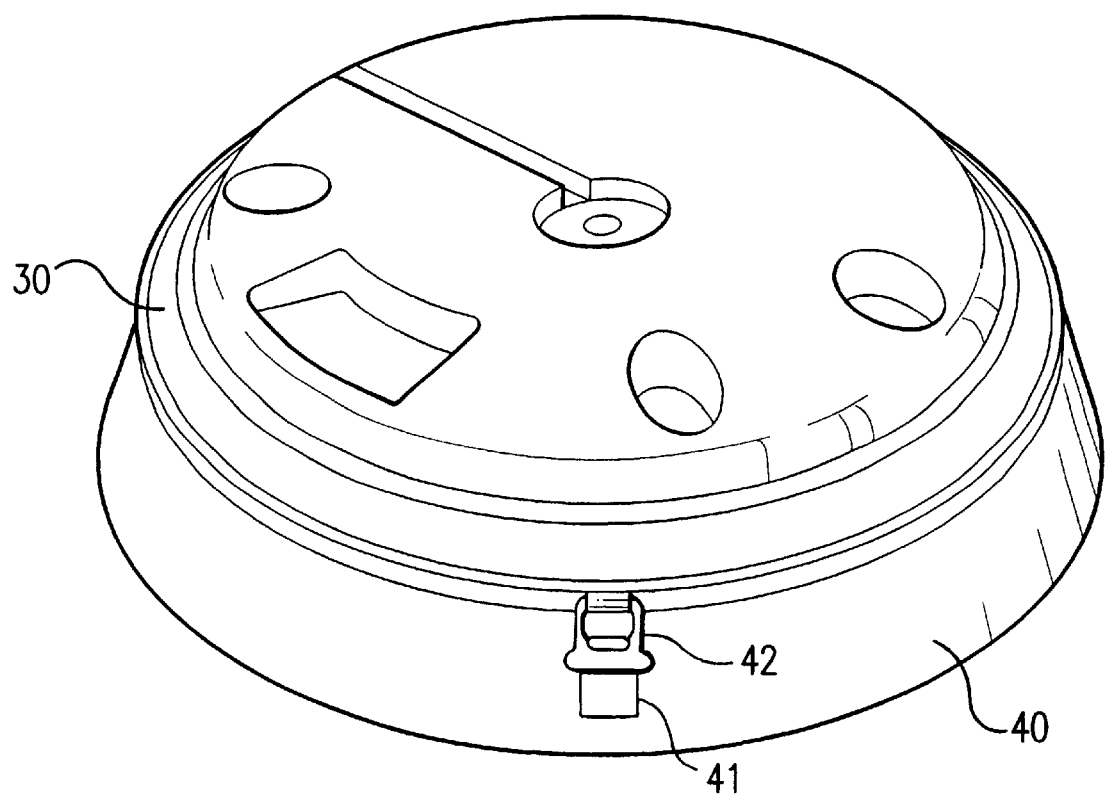
FIG. 17 is a perspective view of the assembled condition of the portable shower assembly of FIG. 1, showing the top member secured to the bottom member.
Figure 19:
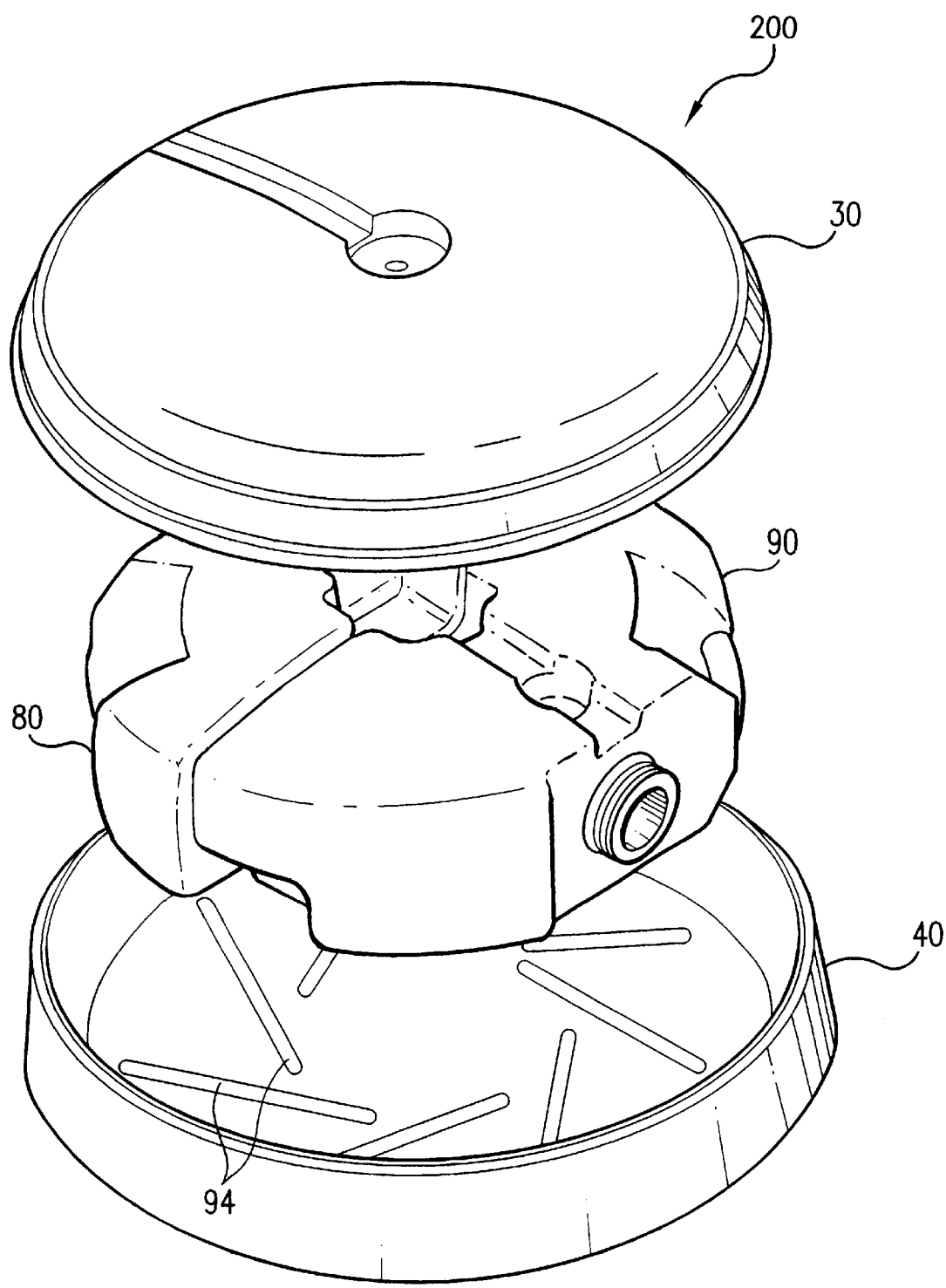

FIG. 17 is a perspective view of the assembled condition of the portable shower assembly 200 of FIG. 1, showing the top member 30 secured to the bottom member 40 via one set of the latches 41 and 42.

Figure 18:
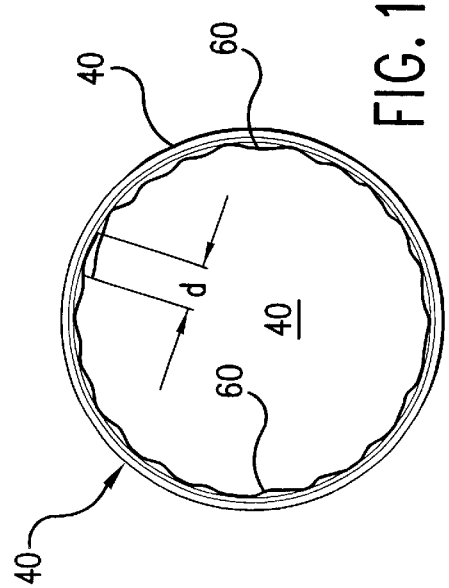
FIG. 18 is a top elevational view of the shower curtain in the assembled condition.

FIG. 18 is a top elevational view of the shower curtain 60 in the assembled condition over the bottom member 40. In this view, the shower curtain 60 has a small region of overlap which extends a distance "d". The distance "d" is preferably about six inches. The shower curtain 60 is preferably hung from the top member 30, either by rings, hooks, or other securement method. The region of overlap is used for entry into, and exit from the interior of the portable shower 100.

The invention being thus described, it will be evident that the same may be varied in many ways. Such variations are not to be regarded as a departure from the spirit and scope of the invention and all such modifications are intended to be included within the scope of the claims.

Portable Shower Apparatus

200—portable shower apparatus
100—portable shower
10—supply pump
12—disposal pump
14—first cigarette lighter adapter
16—second cigarette lighter adapter
20—supply opening
22—disposal opening
24—cap
30—top member
31—first side surface
32—flat wall
33—second side surface
34—curved wall
36—handle
40—bottom member
41—latch
42—complimentary latch
48—shower head
50—supply conduit
52—disposal conduit
60—shower curtain
61, 62, 63—support rods
65—circumferential band(s)
70—remote gray water disposal location
80—supply water tank
90—disposal water tank
92—heater portion
94—slip resistant surface

We claim:

1. A portable shower apparatus, which comprises:
a) a half cylindrical water supply tank with an inlet port and an outlet port, the water supply tank of a dark color to absorb the rays of the sun, the outlet port in fluid communication with a shower head supported by a top member;
b) a selectively actuated supply pump in fluid communication with the outlet port on the half cylindrical water supply tank, the supply pump in electrical communication with a remote electrical power supply source;
c) the top member supported from above in spaced relation above a bottom member;
d) a flexible shower curtain slidably supported about the outer periphery of the top member;
e) a half cylindrical disposal tank with a gray water inlet port, and a selectively actuated outlet port;
f) the bottom member with a raised lip extending about the outer periphery of the bottom member, the bottom member sized to receive the half cylindrical water supply tank and the half cylindrical disposal water tank therein between use, for ease of storage;
g) a disposal pump in fluid communication with the outlet port on the bottom member, the disposal pump electrically powered by a remote electrical supply source, the disposal pump selectively actuated to pump waste water from the half cylindrical disposal tank to a remote gray water disposal location.

2. The portable shower apparatus of claim 1, wherein the half cylindrical water supply tank is sized to hold from about three gallons to about ten gallons of water, and the half cylindrical disposal tank is similarly sized to hold the water dispelled from the supply tank.

3. The portable shower apparatus of claim 1, wherein the half cylindrical water supply tank has a radius of about 12 inches to about 16 inches, and a height of about four inches to about ten inches, and the half cylindrical disposal tank is similarly sized.

4. The portable shower apparatus of claim 1, wherein the supply pump and the disposal pump are in electrical communication with a vehicle battery through a cigarette lighter connection, and the supply pump and the disposal pump are each selectively actuated.

5. The portable shower apparatus of claim 1, wherein at least one support rod supports the top member in spaced relation above the bottom member.

6. The portable shower apparatus of claim 1, wherein a temperature controlled electrical heating element is positioned to heat the water in the supply tank prior to use, and said electrical heating element is in electrical communication with a remote power supply source.

7. The portable shower apparatus of claim 1, wherein a hook is secured above the top member, and the hook is supported from above during use, in the raised position.

8. The portable shower apparatus of claim 1, wherein at least one latch is used to releasably secure the bottom member to the top member, when the portable shower apparatus is in a collapsed position.

9. The portable shower apparatus of claim 1, wherein a releasable cap is used to secure the inlet port on the water supply tank, and wherein a weep hole is provided in the cap to allow air to enter the tank during filling.

10. The portable shower apparatus of claim 1, wherein the shower curtain is sized to be slidably supported about the outer periphery of the top member, and to overlap from about two inches to about six inches for ease of access, and wherein at least one circumferential band is secured adjacent to the shower curtain to maintain the shape of the shower curtain between the top member and the bottom member, during use.

11. The portable shower apparatus of claim 1, wherein the bottom member includes a skid resistant surface, and said skid resistant surface is of sufficient strength to support a user thereon.

12. The portable shower apparatus of claim 1, wherein a handle extends above the top member, for ease of carrying and extending the portable shower apparatus.

13. A portable shower apparatus, which comprises:
a) a half cylindrical water supply tank with an Inlet port and an outlet port, the outlet port In fluid communication with a shower head supported by a top member;

b) a supply pump electrically powered by a remote electrical supply source, the supply pump in fluid communication with the outlet port of the half cylindrical water supply tank;

c) a temperature controlled electrical heating element positioned to heat the water in the supply tank prior to use, said electrical heating element powered by a remote electrical power supply source;

d) the top member supported in spaced relation above a bottom member from above, during use;

e) a flexible shower curtain slidably supported about the outer periphery of the top member, and at least one circumferential band secured about the outer periphery of the shower curtain, to maintain the shape of the shower curtain between the top member and the bottom member;

f) a half cylindrical disposal tank with a waste water inlet port, and a waste water outlet port;

g) a disposal pump electrically powered by a remote electrical supply source, the disposal pump in fluid communication with the out let port on the disposal tank, the disposal pump selectively actuated to pump waste water from the half cylindrical disposal tank to a remote gray water disposal location;

h) the bottom member with a raised lip extending about the outer periphery of the bottom member, the bottom member having a slip resistant surface, said bottom member of sufficient strength to support a user thereon; the bottom member sized to receive the half cylindrical supply tank and the half cylindrical disposal tank within the raised lip of the bottom member during storage.

14. The portable shower apparatus of claim 13, wherein the water supply tank is sized to hold from about three gallons to about ten gallons of water, and the disposal tank is similarly sized to hold the water expelled from the supply tank.

15. The portable shower apparatus of claim 13, wherein the half cylindrical water supply tank has a radius of about 12 inches to 16 inches, and a thickness of about four inches to about ten inches, and the disposal tank is similarly sized.

16. The portable shower apparatus of claim 13, wherein the supply pump and the disposal pump are in electrical communication with a vehicle battery through a cigarette lighter connection, and are each selectively actuated by a suitable actuation means.

17. The portable shower apparatus of claim 13, wherein the shower curtain is sized to be slidably secured to the outer periphery of the top member, and the shower curtain is sized to overlap from about two inches to about six inches, for ease of access, and at least one circumferential band is secured to the shower curtain to maintain the shape of the shower curtain between the top member and the bottom member.

18. A portable shower apparatus, which comprises:

a) a half cylindrical water supply tank with an inlet port and an outlet port, the outlet port in fluid communication with a shower head supported by a top member, the water supply tank sized to hold from about three gallons to about ten gallons of water;

b) a supply pump electrically powered by a vehicle electrical supply source, the supply pump In fluid communication with the outlet port of the half cylindrical water supply tank;

c) an electrical heating element positioned to heat the water In the supply tank prior to use, said electrical heating element powered by a vehicle electrical power supply source;

d) the top member supported In spaced relation above a bottom member from above, during use;

e) a flexible shower curtain sized to be slidably secured to the outer periphery of the top member, and the shower curtain sized to overlap from about two inches to about six Inches, for ease of access, and at least one circumferential band extends about the shower curtain to maintain the shape of the shower curtain between the top member and the bottom member;

f) a half cylindrical disposal tank with a waste water inlet port, and a waste water outlet port;

g) a disposal pump electrically powered by a remote electrical supply source, the disposal pump in fluid communication with the out let port on the disposal tank, the disposal pump selectively actuated to pump waste water from the half cylindrical disposal tank to a remote gray water disposal location;

h) the bottom member with a raised lip extending about the outer periphery of the bottom member, the bottom member having a slip resistant surface, said bottom member of sufficient strength to support a user thereon; the bottom member further sized to receive the half cylindrical supply tank and the half cylindrical disposal upon the bottom member during storage, and the top member releasably secured to the bottom member during storage.

19. The portable shower apparatus of claim 18, wherein the half cylindrical water supply tank has a radius of about 12 inches to 16 inches, and a thickness of about four inches to about ten inches, and the disposal tank is similarly sized.

20. The portable shower apparatus of claim 18, wherein the supply pump and the disposal pump are in electrical communication with a vehicle battery through at least one cigarette lighter connection, and are each selectively actuated by a suitable actuation means.

* * * * *